United States Patent [19]
Ward et al.

[11] 3,940,979
[45] Mar. 2, 1976

[54] HIGH-ACCURACY OPTICAL TORQUEMETER

[75] Inventors: John E. Ward, Lexington; John O. Silvey, Arlington; James K. Roberge, Lexington, all of Mass.

[73] Assignee: Massachusetts Institute of Technology, Cambridge, Mass.

[22] Filed: Oct. 11, 1973

[21] Appl. No.: 405,612

[52] U.S. Cl. ............................................. 73/136 A
[51] Int. Cl.² ........................................ G01L 3/06
[58] Field of Search ................................. 73/136 A

[56] References Cited
UNITED STATES PATENTS

| | | | |
|---|---|---|---|
| 2,402,719 | 6/1946 | Allison | 73/136 A |
| 2,938,378 | 5/1960 | Canada et al. | 73/136 A |
| 3,625,055 | 12/1971 | Lafourcade | 73/136 A |
| 3,762,217 | 10/1973 | Hagen | 73/136 A |
| 3,824,848 | 7/1974 | Parkinson | 73/136 A |

OTHER PUBLICATIONS

Metron Torquemeter – Metron Instrument Co. Bulletin, Dated 7-1-59.
Torque Transducers from "Instrument & Control Systems", Vol. 41, p. 64, Sept. 1968.

*Primary Examiner*—James J. Gill
*Attorney, Agent, or Firm*—Arthur A. Smith, Jr.; Robert Shaw; Martin M. Santa

[57] ABSTRACT

An optical torquemeter adapted to provide torque readings as accurate as 1-to-2 foot pounds over a torque range of the order of 1 to 2 thousand foot pounds. It converts a binary-type optical message to an electric signal in the form of variable-width pulses. The width of the electric pulses indicates both the magnitude and the direction of torque and the pulses are processed to provide an output representing torque.

27 Claims, 10 Drawing Figures

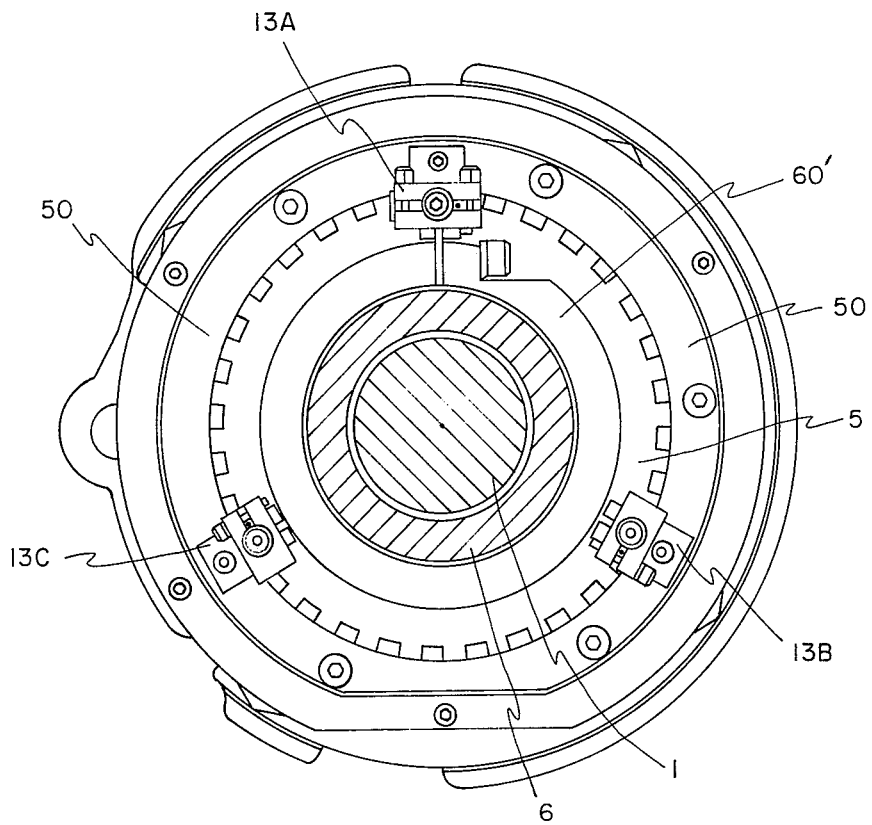
FIG. 2
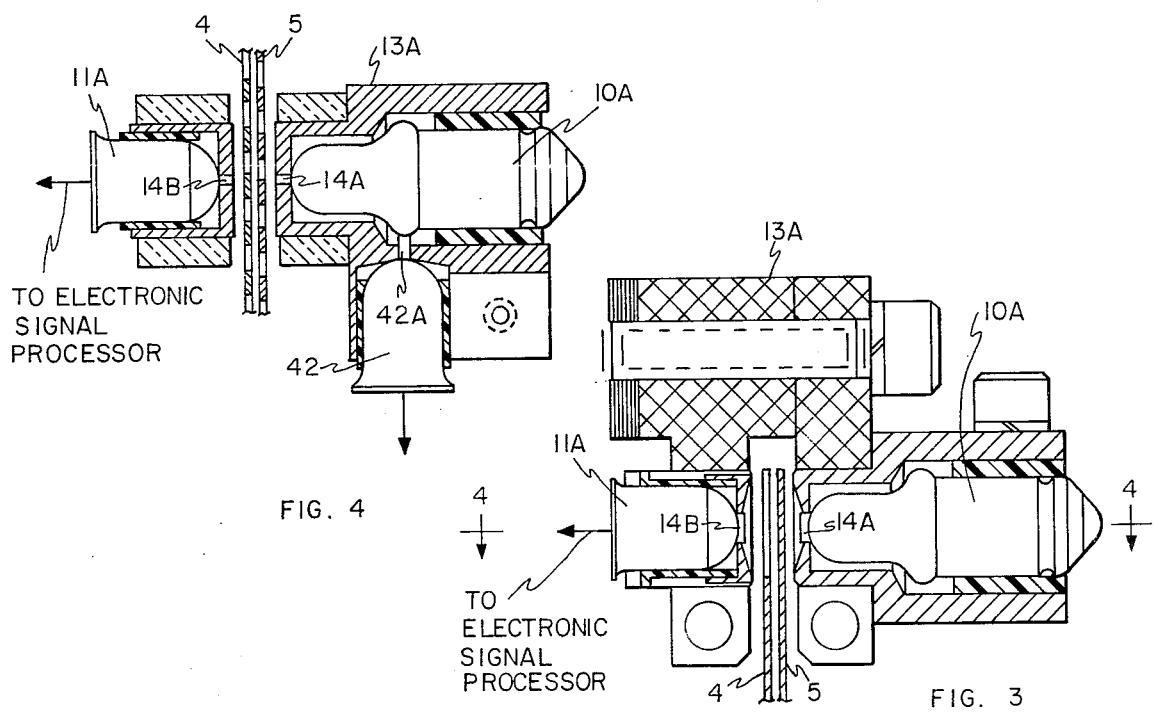
FIG. 4
FIG. 3

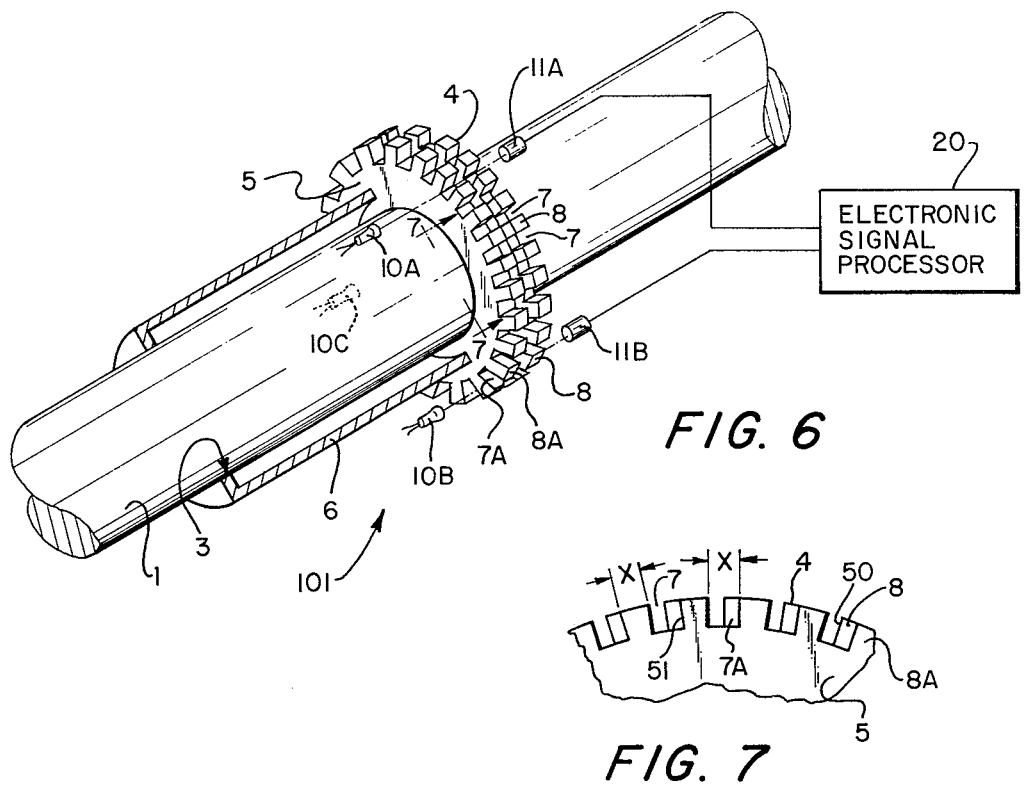
FIG. 6
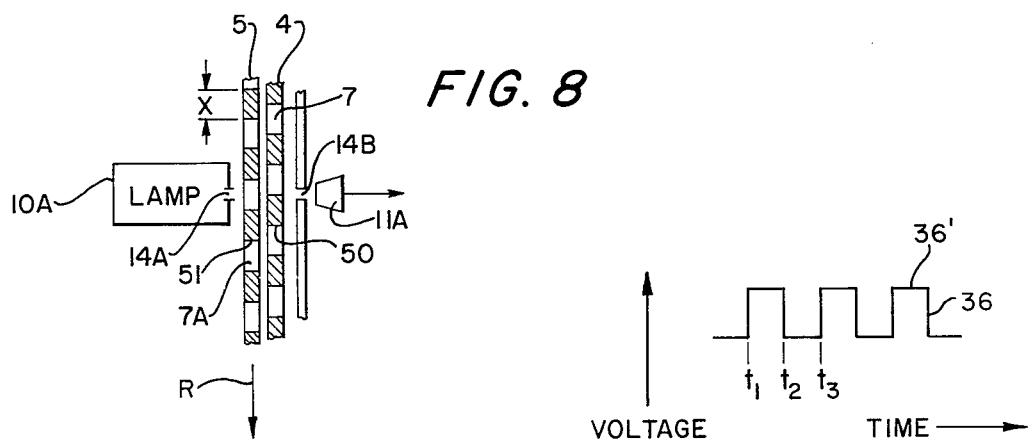
FIG. 7
FIG. 8
FIG. 9

HIGH-ACCURACY OPTICAL TORQUEMETER

The present invention relates to optical-type torquemeters and, more particularly, to highly accurate torquemeters.

Attention is called to U.s. Pat. Nos. 2,586,540 (Holden); 3,495,452 (Johnson, Jr. et al); 2,136,223 (Thomas); 2,323,923 (Chubb); 2,947,168 (Yang); 3,130,581 (Schulman); 2,402,719 (Allison); 2,938,378 (Canada et al); 3,111,028 (Lebow).

In applications for Ser. No. 141,486, filed May 10, 1971, Ser. No. 264,120, filed June 19, 1972 and Ser. No. 264,121, filed June 19, 1972 (Pratt, Jr., et al), there are described a number of embodiments of an optical torquemeter of which the instant invention presents novel modifications thereof. The torquemeter there described is discussed with regard, among other things, to use in connection with automobile control functions. Among the functions controllable is that of shifting automatic transmissions. To perform that function the torquemeter must sense torque differences of the order of 5 foot pounds or less over a torque range as much as 0 to 2,000 ft-pounds. It will be appreciated that the torquemeter embodiments described in said applications and hereinafter have other uses than described; however, any torquemeter to be useful must have an accuracy at least of the order of 2 percent of the range of torques over which the instrument is intended to read.

Accordingly, an object of this invention is to provide novel modification of and improvement upon the optical torquemeter disclosed in said applications.

A further object is to provide an optical torquemeter capable of reading to within 2 percent of the maximum range of the instrument and, if required, to an accuracy of the order of 0.1 to 0.2 percent of such range, and on a consistent basis.

These and further objects are brought out in the description that follows and are particularly pointed out in connection with the appended claims.

The objects of the invention are attained by torquemeter apparatus which measures torque as a function of twist of a torque-bearing, mechanical coupling member. In the embodiment hereinafter described in greatest detail, the member is a shaft to which there is attached at axially spaced regions two slotted discs. The shaft twists in either direction as a function of torque. One of the discs is mounted on or is part of a sleeve that extends axially from the region of attachment toward the other disc in order to bring the two in close-spaced relationship to one another. A radiation source is positioned to shine light through the slots of both discs and a detector is positioned to receive the radiation after it has passed through the slots in both discs. The detector senses the passage of each edge or boundary between the slots and the teeth of each disc. To provide the necessary accuracy, the cross dimension of the effective area of the detector must be very small (typically the order of 5 mils) and this can be accomplished by providing narrow slits immediately in front of the detector and immediately in front of the radiation source. The detector converts binary-type light signals to variable-width electric pulses whose duty cycle is related to the torque transmitted by the shaft in either direction of twist and determines both the direction and the magnitude of such twist to provide an indication of torque. To permit sensing of both clockwise and counterclockwise twist, the boundaries on one disc are aligned with the slots of the other disc and preferably are approximately centered. The radiation source and the detector are rigidly interconnected to minimize unwanted signals and a plurality of both is used further to minimize such noise.

The invention is hereinafter discussed with reference to the accompanying drawing in which:

FIG. 2 is a view taken upon the line 2—2 in FIG. 1, looking in the direction of the arrows and shows three of the unitary mechanical elements spaced 120° around the discs;

FIG. 3 is a side-section view of the top unitary mechanical element in FIG. 2, which has a radiation source and radiation detector, as do the other two, but has a further detector to monitor the radiation level of the radiation source in the top unitary element;

FIG. 4 is a view taken upon the line 4—4 in FIG. 3 looking in the direction of the arrows;

FIG. 6 is an isometric view of the apparatus in FIG. 1, but is more diagrammatic in form and contains electrical circuitry in block diagram form;

FIG. 7 is a partial view taken upon the line 7—7 in FIG. 6 looking in the direction of the arrows, and shows clearly the deliberate misalignment of the slots and teeth of the slotted discs of FIG. 8;

FIG. 8 is a diagrammatic top partial view showing the positioning of one source-detector pair relative to the slotted discs of FIG. 6 and it shows also a slit in front of both the source and the detector;

FIG. 9 shows a pulse-width modulated electric pulse which is formed at an intermediate part of the electrical circuitry.

Figure 1:
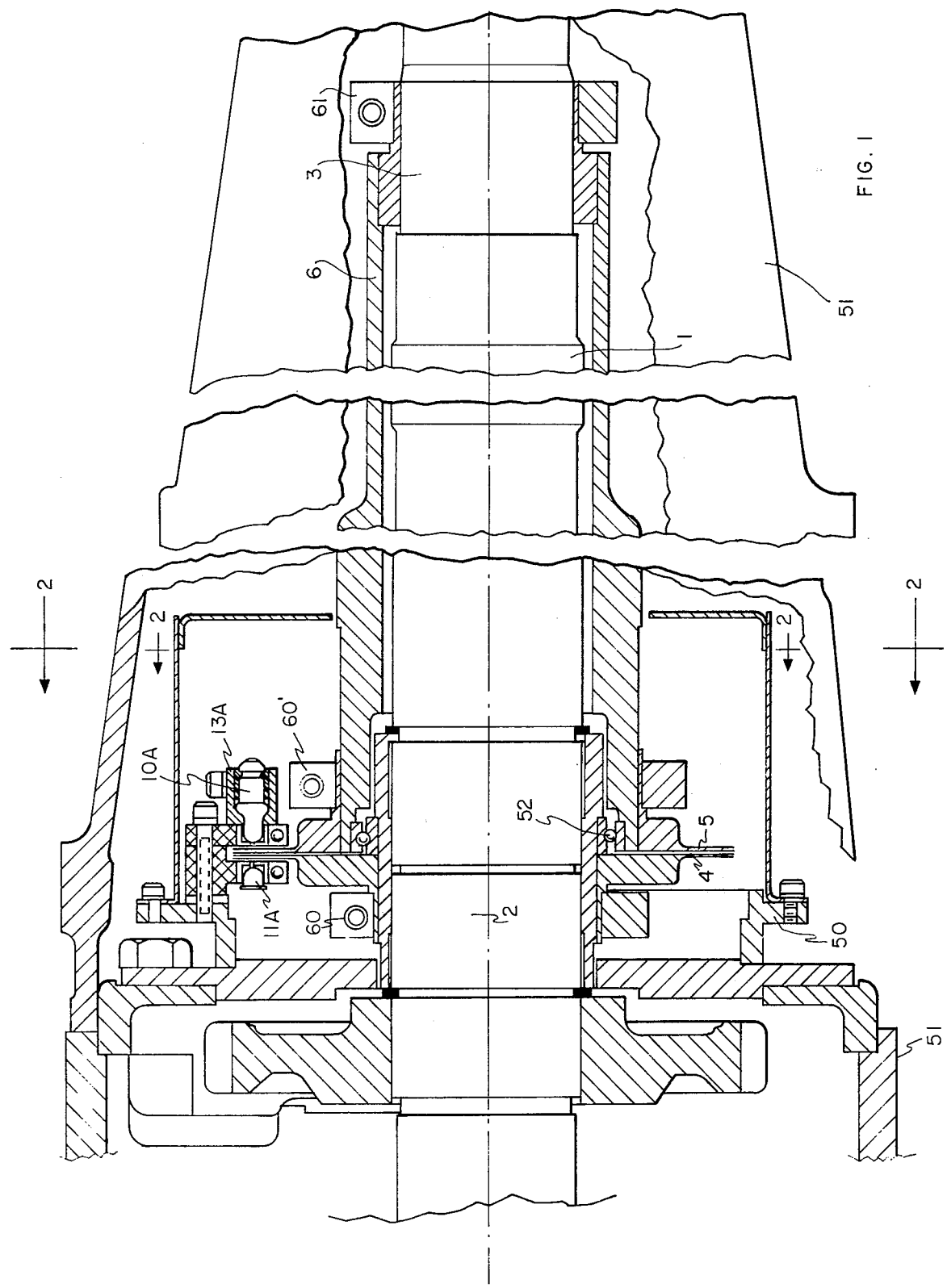
FIG. 1 is a side view, partially cutaway, showing a shaft to which is attached, in close axial disposition, two slotted flanges or discs and including a plurality of radiation sources and radiation detectors in associated pairs, each source-detector pair being held in rigid mechanical relationship by a unitary mechanical element.

In what follows, there is first a general discussion of the optical torquemeter apparatus shown at 101 in FIG. 6 and this is followed by more specific comment. The torquemeter 101 is adapted to measure torque transmitted by the shaft labeled 1 as the shaft rotates and this is done by measuring the twist upon the shaft 1 (in either direction of twist) due to torque between a first axial region 2 (in FIG. 1) of the shaft and a second region 3 axially spaced along the shaft from the first region. The apparatus 101 comprises closely axially-spaced, coaxial discs 4 and 5 secured to the shaft to rotate therewith. The disc 4 is secured to the shaft at the first region 2 and the disc 5, as shown and as noted in greater detail hereinafter, is mounted on a sleeve 6 which is secured to the shaft 1 at the second region 3; the sleeve 6 extends axially toward the first region to place the discs in very close proximity to one another (~ 1 millimeter or less). Each of the discs 4 and 5 has a series of contiguous areas 7, 8 and 7A, 8A, respectively, of different optical characteristics extending circumferentially around the disc. In the embodiment herein disclosed, as best shown in FIGS. 6 and 7, the areas 7 and 7A are slots and the areas 8 and 8A are teeth so that the adjacent areas are alternately radiation transmitting and radiation opaque. The areas 7 etc. extend circumferentially to form an annular pattern on each disc, the major radii of the annuluses being substantially equal so that radiation from three radiation sources 10A, 10B and 10C can pass through the slots 7 and 7A, to the associated radiation detectors 11A, 11B and 11C, respectively, positioned to receive the radiation from the associated source after it has passed through the slots of both discs. Each radiation detector is operable to provide a series of primary electric pulses, like the pulses shown at 31 in FIG. 5, as a pulse train 31A.

The pulses 31 form a train of electric pulses that are pulse-width modulated as a function of the torque (clockwise or counterclockwise) transmitted by the shaft 1. An electronic signal processor labeled 20 in FIG. 6 receives the pulse trains 31A . . . from the radiation detectors and processes the plurality of pulse trains, in the manner later described. In the course of such processing there is formed a train 36 of rectangular-wave pulses 36′ from each of the pulses of the trains 31A . . . . The pulses 36′ vary in width as a function of torque transmitted by the shaft 1, the torque being reflected in the duty cycle of the combined average for the three detectors where $$\text{duty cycles} = \frac{\text{pulse width}}{\text{pulse period}} \quad \begin{array}{l}(\text{i.e., } t_2 - t_1 \text{ in FIG. 9})\\(\text{i.e., } t_3 - t_1 \text{ in FIG. 9})\end{array}$$

In the apparatus herein described the duty cycle used to provide an output from the circuitry 20 is the averaged duty cycle for the plurality of pulse trains 36 over a period of one or more revolutions of the shaft, or at least a portion of a revolution.

In order to place some perspective in this explanation, the torquemeter 101 described in detail later, can be used to control certain automobile functions. The shaft 1 in this apparatus is one and one half inches in diameter. It is necessary that the torquemeter operate over a torque range of from 0 to more than 2000 foot pounds, in −40°C to +125°C temperatures under conditions of mechanical vibration (rotational as well as translational), and yet provide torque readings to a resolution of 1 foot pound on a consistent basis. In this situation and when the regions 2 and 3 are separated 12 inches, a torque of 1 foot pound represents a twist of about 27 microradians; this is a linear displacement of about 40 micro-inches between areas on the discs 4 and 5 if the discs are 3 inches in diameter and the slots and teeth are at the periphery thereof.

It should be apparent on the basis of the explanation herein that in order to obtain the necessary accuracy, torque resolution and consistency, a number of important measures must be taken to provide an acceptable torquemeter. Thus, for example, to prevent any movement under conditions of vibration and the like, between the radiation sources 10A . . . and associated radiation detectors 11A . . . , the associated pairs 10A-11A, 10B-11B and 10C-11C are secured within unitary mechanical elements 13A, 13B and 13C, respectively, to hold the sources and the detector in rigid relationship to one another. Each of the elements 13A, 13B and 13C has slits such as, for example, the slits shown at 14A and 14B in FIG. 8 of the element 13A. Radiation from the source 10A passes through the slit 14A to narrow the beam, through the slots 7 and 7A and through the slit 14B to strike the detector 11A. To supply the necessary accuracy contemplated by this apparatus, it is essential that the pulses 31 have flat rise and fall times (i.e. fast pulse transition times). This requires, among other things, that the slit 14A and the slit 14B be narrow compared to the length labeled X in FIG. 8 of the slots 7–7A and teeth 8–8A so that the effective portion or zone of the detector 11A, that receives radiation is small in cross dimension. Said another way, in order to have the required fast rise and fall times of the pulses 31 from the detector 11A (as well as the other detectors) it is necessary that the dimension of the effective portion or zone of the detector in the direction of travel (the direction indicated by the arrow shown at R) of the contiguous areas 7–8 and 7A–8A therepast be small compared to the length X of the areas 7 etc. in such direction. It is also necessary that the detector light-to-electrical energy time response constants be fast compared to the time of passage of the areas past the detector. That is, the response time constants are sufficiently fast that the rise and fall times of each primary electric pulse are much less than the time duration of the primary electric pulse. In the particular apparatus discussed, the slits 14A etc and 14B etc. are the order of 5–6 mils across and the slots 7, 7A and teeth 8, 8A the order of 0.062 inches in circumferential length X.

A short further explanation of some points in the previous paragraph is in order. The width of any of the optical pulses and resulting electrical pulses is a function of tooth overlap and the variable of interest is the ratio of such overlap to slot-to-slot transit time. This makes the necessary measurements basically independent of angular speed of the shaft 1 — subject to the ability of the electronics to deliver an accurate proportional d.c. voltage output at 41, as later discussed, over a wide range of slot-to-slot transit times. Also, it should be noted, the relative effect of a given shaft twist (which is quite small for most torque encountered and reasonable separation between the regions 2 and 3) is inversely proportional to the circumferential length X of the slots and is, thus, proportional to the number of slots. The number of slots should therefore be large as possible commensurate with the largest shaft twist expected, the width of the detecting apertures or slits 14B . . . (i.e., the effective cross dimension of the detectors 11A . . . in the circumferential direction R in FIG. 8), and any time constants in the electronics that affect the leading and trailing slopes of the electric pulses 31 over the special range of interest.

A number of mechanical facets of the apparatus 101 contribute in a vital way in the achievement of the necessary accuracy noted. Thus, the mechanical elements 13A . . . are mounted at equally spaced intervals on a stationary and rigid mounting ring 50 that is secured to a housing labeled 51 of the apparatus 101. In this way, the radiation sources 10A . . . and associated radiation detectors are disposed at circumferential positions around the discs 4 and 5 and held rigidly in relative angular disposition to one another. The three equally spaced (i.e. 120°) source detector pairs 10A–11A etc. act to filter mechanical noise due, for example, to differences in the slot and teeth dimensions, to radial shifts in the shaft through wear and the like, shaft distortion for any reason, etc., and the three detection points together with the electrical circuitry also remove electrical noise. The sleeve 6 is clamped by a clamp 61 to the region 3, but is free to twist angularly relative to the shaft 1 at the region 2, ball bearing 52 being provided to minimize radial movement at the latter region. The discs 4 and 5 are respectively clamped to the shaft 1 and the sleeve 6 by clamps 60 and 60'.

The mechanical element shown in FIGS. 3 and 4 is the element 13A which differs slightly from the elements 13B and 13C in that the former contains, in addition to a source like 10B and 10C and a detector like 11B and 11C, a reference radiation detector 42 that serves to monitor the level of intensity of radiation from the lamp 10A for purposes mentioned in the next paragraph. The detector 42 is accessible to the source 10A through an internal aperture 42A in the element 13A.

Figure 10:
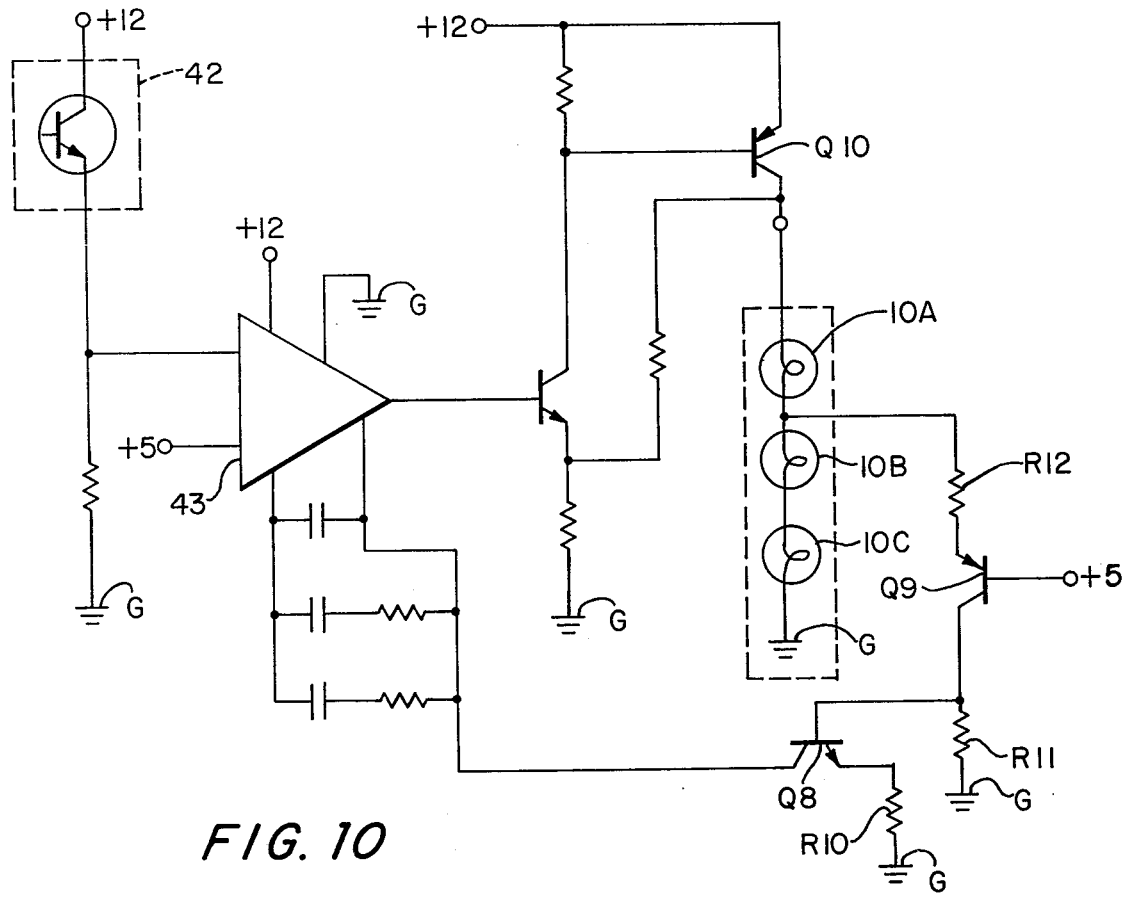
FIG. 10 shows circuitry adapted to maintain relatively constant output intensity from the radiation sources.

The apparatus 101 is insensitive to moderate changes in the intensity of the radiation sources 10A, 10B and 10C. However, beyond some point the radiation level does affect the output reading. The circuitry in FIG. 10 acts to maintain the radiation level as constant as possible. It will be noted that the radiation sources 10A . . . are connected in series and are energized by a transistor $Q_{10}$ which acts to provide constant radiation output from the lamps which act as the radiation sources. The photo transistor 42 in the mechanical element 13A senses the radiation level of the source 10A held within the same element. The output of the photo transistor 42 is fed to an amplifier 43 and then acted upon by the further circuitry in FIG. 10 to provide, through the lamps 10A . . . , a current which will maintain constant illumination from the lamps. The circuitry comprising transistors $Q_8$ and $Q_9$ and resistances $R_{10}$, $R_{11}$ and $R_{12}$, constitutes a protection circuit that permits maximum current flow through the series-connected lamps 10A, 10B and 10C, but prevents over-current. The function here is to control the maximum and minimum levels of a pulse train 32. This can be done also by feeding information from the peak and valley detectors later discussed to control either the gain of the associated amplifier (15A . . . ) or the radiation level of the radiation sources.

Figure 5:
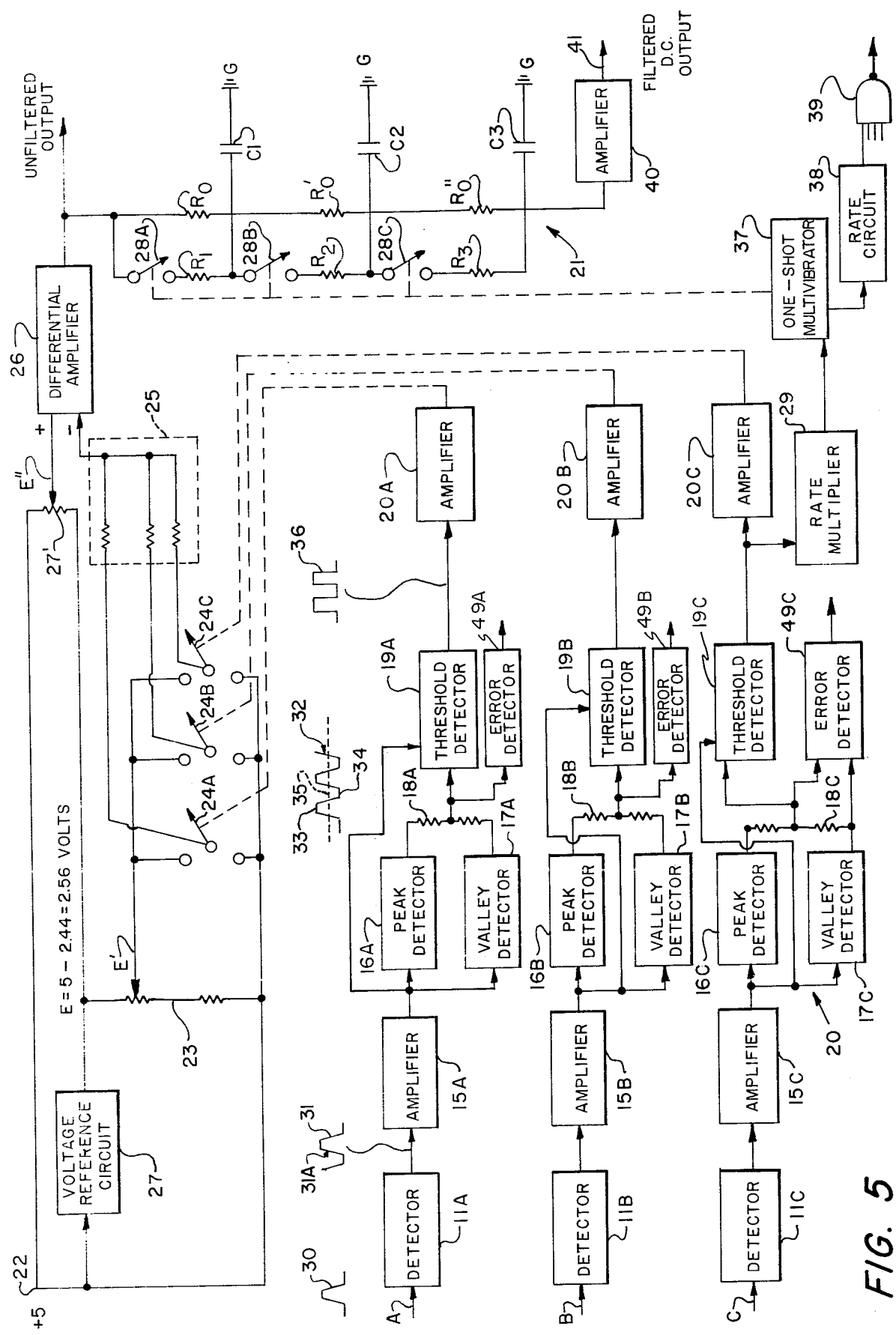
FIG. 5 is a schematic circuit diagram, partly in block-diagram form, of an analog intregrator and filter.

The electronic signal processor 20 is shown in detail in FIG. 5 wherein optical pulses, such as, for example, the pulse shown at 30, of variable width are introduced at A, B and C to the detectors 11A, 11B and 11C, respectively, the outputs of the detectors being electric pulses like the pulses 31, similar in shape to the pulse 30. The outputs of the detectors 11A, 11B and 11C are connected to pulse shaper circuitry which is the portion of the processor 20 described in the next paragraph. Of course, the pulses 30 are in the form of an optical pulse train similar to the pulse train 31A. The electric pulse train 31A from each radiation detector is operated upon in an identical fashion; it is sufficient, then, for present purposes to describe one channel, but numbering in FIG. 5 reflects the identity.

The electric pulse train 31A is fed to the amplifier 15A whose output is connected to a peak detector 16A (which locates the maximum voltage level shown at 33 of the amplified electric pulse train designated 32 in FIG. 5), to a valley detector 17A (which locates the minimum voltage level shown at 34) and to one input of a threshold detector 19A. The outputs of the peak detector and the valley detector are connected across a voltage divider 18A whose output, in turn, is connected as the second input to threshold detector 19A. In the circuitry of FIG. 5, the output of the divider 18A is the midpoint thereof and the divider acts to locate triggering points along the dotted line 35 which is halfway between the maxima 33 and the minima 34, but some other intermediate point can be used. The threshold detector 19A (and 19B and 19C) is, therefore always triggered at the midpoint or, more precisely, at the weighted average of the midpoints of the electric signal (or at some other consistent intermediate levels thereof) of the electric signal 32. The variable-width rectangular-wave output 36 of the threshold detector 19A is connected to an amplifier 20A and the threshold detectors 19B and 19C are similarly connected to amplifiers 20B and 20C, respectively. At this juncture, the trains of variable-width pulses 36' can be combined and/or otherwise processed to provide an output representative of torque being transmitted by the shaft 1, but because of the stringent requirements here the output signal of the pulse shaper is further refined as explained in the next few paragraphs which relate to actual apparatus.

The circuitry at the upper portion of FIG. 5 accepts the three amplified logic-level duty cycle signals 36 . . . from the amplifiers 20A, 20B and 20C and produces both filtered and unfiltered d.c. output voltages proportional to torque. The reference voltage for these output signals is a voltage supply (5 volts in the actual apparatus) connected to the terminal marked 22, and the output voltage is greater or less than the reference voltage as torque is positive or negative, i.e., as the discs 4 and 5 change in angular displacement from a zero-torque position.

One of the problems in designing a circuit capable of integrating three pulse-width-modulated signals to produce a d.c. level with an accuracy and resolution of one part in two thousand is that the amplitudes of the pulse-width modulated (PWM) signals must be much more carefully controlled than the normal output levels of logic gates. Thus, the first step in the pulse averaging circuit is to use the three duty cycle signals 36 from the threshold detectors 19A . . . , which are logic levels, to switch a high-accuracy d.c. voltage reference to produce the actual signal that is averaged. (In actual fact the signals 36 are first amplified by amplifiers 20A, 20B and 20C.) As shown in FIG. 5, a voltage reference circuit 27 establishes a voltage E that is 2.44 volts lower than the +5-volt supply, and each duty cycle signal effectively operates a switch (i.e., the switches labeled 24A, 24B and 24C) that switches between E', corresponding to light transmission, and +5 volts, corresponding to no light transmission. The voltage E' is a fraction of (5–2.44) and is derived from a potentiometer 23. Varying E' changes the scale factor (slope) of the torque output signal.

The outputs of the switches 24A . . . are resistively summed in a summing network 25 to provide one input to a differential amplifier 26; the other input is a voltage E'', which again is a fraction of the voltage (+5–2.44), determined by a potentiometer 27'. Thus the whole averaging system floats with the +5 volt supply, and the amplitude of the integrated pulses is established by a very stable 2.44 volt zener diode reference 27. The switches 24A . . . referred to above could conceptually be any kind of switch including reed switches but are, in fact, implemented with six field effect devices, two for each duty cycle signal. The output of the differential amplifier 26 is the unfiltered torque output and can be brought out for some control purposes.

The circuitry shown at 21, comprising resistors $R_0$, $R_0'$, $R_0''$, $R_1$, $R_2$ and $R_3$, capacitors C1, C2 and C3 and switches 28A, 28B, and 28C, is a variable filter. The strategy of the filter is to duty-ratio switch the series resistor in each R-C section so as to create an effective resistance $$R_{eff} = R_{actual} \times \frac{1}{\text{duty ratio of one-shot 37 output}}.$$

This switching is performed by the three field effect devices 28A, 28B and 28C driven by a signal derived from the duty cycle signal output of one of the threshold detectors, 19C for example as shown in FIG. 5. Because switching at the actual duty cycle rate would cause ripple in the output at low speeds, the duty cycle signal output is first increased in frequency by a rate multiplier 29 (the rate multiplication in the experimental apparatus is by a factor of seven; other ratios can be used) whose output drives a one-shot multivibrator 37. It is the one-shot signal that drives the FET switches 28A .... The one-shot 37 also trips error circuitry including a rate circuit 38 when its rate falls below a preset value, providing the fourth input to a NAND gate 38, the other three inputs to which come from the error detectors labeled 49A, 49B and 49C. The error detectors 49A and 49B receive inputs from voltage dividers 18A and 18B, respectively. Error detector 49C, associated with threshold detector 19C receives inputs directly from the peak and valley detectors 16C and 17C because of the signal output already applied to the error circuitry from the voltage divider 18C by the threshold detector 19C.

The output of the filter 21 is connected to an amplifier 40 whose output 41 is the d.c. output signal from the torquemeter, and represents the torque transmitted by the shaft. The filtered output can be connected to appropriate external instrumentation and also in the apparatus made is fed back as an FET switch bias for the last two filter stages. A separate bias control for the first-stage FET switch is provided by a follower amplifier incorporated into the network.

The filter time constants in the apparatus built were chosen so as to provide a factor of 10 attenuation at the cyclic rate of the shaft, i.e., to reduce once-per-cycle components by a factor of 10. This produces a filter time constant approximately equal to one-half a shaft rotation period. For example, at 10 MPH, shaft speed is 32 rpm. or about 0.5 revolutions per second; thus the time constant is about 1 second. This decreases linearly with speed.

Despite considerable effort to have the slotted discs made as accurately as possible, it is difficult in practice to maintain tooth-to-tooth accuracy commensurate with the torque measurement resolution desired. The filter 21 acts as a time averager which averages out and removes noise due to variations in tooth width over one revolution or a portion thereof. The output at 41 is a d.c. voltage whose magnitude represents torque; d.c. voltage output at 41 for zero transmitted torque is determined and values above and below the zero-torque reading represent transmitted torque in the clockwise or counterclockwise direction, as the case may be.

Some further points not previously mentioned are contained in this and the next few paragraphs. In order to measure torque and changes in torque in either direction, that is, whether the twist of the shaft is clockwise or counterclockwise, the teeth and slots 7 and 8 of the disc 4, as best shown in FIGS. 7 and 8, are deliberately misaligned relative to the slots and teeth 7A and 8A of the disc 5. Ideally an edge 50 between a slot and a tooth of the disc 4, at zero transmitted torque, is displaced an angular distance of X/2 from an edge of the disc 5. The width of the pulses of the pulse train 36 are a function of the relative displacement of the edges 50 and 51 from one another; and the d.c. voltage output at 41 is, therefore, also a function of that relative displacement.

A torquemeter based on edge detection has a basic problem that there is no signal when the shaft is stopped, or moving so slowly that no output is possible. Thus, the circuitry in FIG. 5 contains the rate circuit 38 connected as one input to the NAND gate 89 that has an output only in the circumference wherein four inputs are present. If for any reason (e.g. failure of sources 10A ... or pick-ups 11A ... ) one of the inputs to the gate 39 from the rate circuit 38 or error detectors 49A, 49B and 49C drops below a certain level, there will be no output from the gate 39.

As mentioned, the output 41 is a d.c. voltage whose level represents torque. Work done by another here at Massachusetts Institute of Technology and discussed in an accompanying application, entitled "Digital Torquemeter and the Like" (Spinella), Ser. No. 405,573, filed Oct. 11, 1973 shows that the output can be digital.

A number of mechanical elements in FIG. 1 are required because of the particular use for which the torquemeter thereshown in intended, but are not required for more general torquemeter requirements; and these particular elements are not discussed herein.

The invention is described herein mostly with reference to a system wherein radiation is directed upon both discs which chop the same to provide variable-width optical pulses. It is to be appreciated, however, that the elements 4 and 5 could also be the bands disclosed in the Pratt et al applications, in which case the optical signals are sensed to form primary electric pulses which are combined to form the rectangular-wave pulses whose width is a function of torque.

Modifications of the invention herein described will occur to person skilled in the art and all such are deemed to be within the spirit and scope of the invention as defined by the appended claims.

What is claimed is:

1. Apparatus for measuring torque transmitted by a rotating shaft, that comprises: a pair of closely, axially spaced regions along the shaft at each of which is located a disc containing at the same radial distance from the axis of the shaft a series of contiguous areas of different radiation-transmitting characteristics with a sharply defined edge between adjacent areas; means for sensing the relative angular displacement between the areas of the disc at one region from the areas of the disc at the other region and operable to produce at least three primary electric signals, each primary electric signal being a series of pulses whose width is related to said angular displacement, the angular displacement from a zero-torque position being a function of the torque transmitted by the shaft, said means for sensing comprising at least three sources of radiation positioned to direct radiation through the radiation-transmitting areas of one disc and then through the radiation-transmitting areas of the other disc, at least three radiation detectors, one associated with each source of radiation, positioned to receive the radiation from the associated source of radiation after it has passed through radiation-transmitting areas of both discs, each detector being operable to provide said series of electric pulses as a pulse train, a unitary mechanical element that holds each radiation source and associated radiation detector in rigid mechanical relationship to one another, the at least three sources of radiation and associated detectors being positioned substantially symmetrically about the disc; and means for combining the pulse trains from the three detectors to provide an averaged output signal representative of torque.

2. Apparatus as claimed in claim 1 in which the discs are slotted at or near the periphery to provide said areas in the form of slots and teeth of the thusly slotted discs, the radiation as it passes through the discs being chopped to form optical pulses whose widths are a function of the torque transmitted by the shaft.

3. Apparatus as claimed in claim 1 in which one of said discs is secured coaxially to the shaft at the first region and the second of said discs is mounted on or is a part of a sleeve which is secured to the shaft at the second region, the sleeve extending axially toward the first region to bring the discs to 1 millimeter or less of one another.

4. Apparatus as claimed in claim 1 that includes pulse shaper circuitry associated with each source of radiation and radiation detector connected to receive the primary electric signal from each radiation detector and to process the same in order precisely to determine the duty cycle.

5. Apparatus as claimed in claim 4 in which the pulse-shaper circuitry associated with each source of radiation and radiation detector comprises: an amplifier connected to receive the primary electric signal and to amplify the same, means for detecting the maximum and minimum signal levels of pulses from the amplifier output, and a threshold circuit connected to receive as one input thereto a weighted average of the two levels as a threshold and as another input thereto the amplified primary electric signal, the two inputs to the threshold circuit combining to trigger the same to provide an output train of rectangular pulses whose individual pulse width is consistently measured at the level of said weighted average and whose width is a function of said angular displacement.

6. Apparatus as claimed in claim 5 that further includes means to control the signal level of the amplifier output.

7. Apparatus as claimed in claim 6 in which the means to control the signal level of the amplifier output includes a reference radiation detector, not affected by the discs, which provides a signal that is used to adjust the intensity of the radiation sources.

8. Apparatus as claimed in claim 1 that includes pulse-shaper circuitry associated with each source of radiation and each radiation detector, connected to receive a primary electric signal and operable to provide a train of rectangular-wave electric pulses whose individual pulse width is a function of said transmitted torque.

9. Apparatus as claimed in claim 8 that includes means connected to receive the trains of rectangular-wave pulses and to provide an output pulse train made up of pulses whose width is related to the width of the rectangular-wave pulses and whose height is a predetermined and constant magnitude voltage.

10. Apparatus as claimed in claim 9 that further includes circuitry for averaging the output pulse train to produce a d.c. signal representative of the torque transmitted by the shaft.

11. Apparatus for measuring torque transmitted by a rotating shaft, that comprises: a pair of closely, axially spaced regions along the shaft at each of which is located a disc containing at the same radial distance from the axis of the shaft a series of contiguous areas of different radiation-transmitting characteristics with a sharply defined edge between adjacent areas; means for sensing the relative angular displacement between the areas of the disc at one region from the areas of the disc at the other region and operable to produce a primary electric signal as a series of electric pulses whose width is related to said angular displacement, the angular displacement from a zero-torque position being a function of the torque transmitted by the shaft, said means for sensing comprising a source of radiation positioned to direct radiation through the radiation-transmitting areas of the one disc and then through the radiation-transmitting areas of the other disc; a radiation detector positoned to receive the radiation after it has passed through radiation-transmitting areas of both discs and operable to provide said series of electric pulses as a pulse train, and a unitary mechanical element that holds the radiation source and the radiation detector in rigid mechanical relationship to one another; pulse-shaper circuitry connected to receive the primary electric signal and operable to provide a train of rectangular-wave electric pulses whose width is a function of said transmitted torque; means connected to receive the train of rectangular-wave pulses and to provide an output pulse train made up of pulses whose width is related to the average width of the rectangular-wave pulses and whose height is a predetermined and constant magnitude voltage; circuitry for averaging the output pulse train to produce a d.c. signal representative of the torque transmitted by the shaft; and an output filter connected to receive said d.c. signal, the characteristics of said output filter being varied as a function of the repetition rate of the rectangular-wave pulses so as to produce an output approximately equal to the time average of the input when averaged over approximately that time required for the discs to make one revolution.

12. Apparatus for measuring torque transmitted by a rotating shaft, that comprises: a pair of closely, axially spaced regions along the shaft at each of which is located a disc containing at the same radial distance from the axis of the shaft a series of contiguous areas of different radiation-transmitting characteristics with a sharply defined edge between adjacent areas; means for sensing the relative angular displacement between the areas of the disc at one region from the areas of the disc at the other region and operable to produce a primary electric signal as a series of pulses whose width is related to said angular displacement, the angular displacement from a zero-torque position being a function of the torque transmitted by the shaft, said means for sensing comprising a plurality of radiation sources and associated radiation detectors disposed at circumferential positions around the discs and held rigidly in relative angular disposition to one another, the radiation detectors producing a plurality of pulse trains; pulse shaper circuitry connected to receive the electric signals from the plurality of detectors and to process the same in order precisely to determine the duty cycles, said pulse shaper circuitry comprising an amplifier connected to receive the pulse train from each detector, means for detecting the maximum and minimum signal levels of pulses from each amplifier output, a plurality of threshold circuits one connected to receive the output of each amplifier and to use a weighted average of the two levels as a threshold to provide an output train of rectangular pulses whose width is a function of said angular displacement; means connected to receive the rectangular-wave pulses from the threshold circuit associated with each amplifier and to provide output pulse trains made up of pulses whose widths are related to the widths of pulses from the threshold circuits and whose heights are a predetermined and constant magnitude; circuitry for time averaging the weighted sum of the plurality of output pulse trains to produce a d.c. signal representative of the torque transmitted by the shaft; and an output filter connected to receive said d.c. signal, the characteristics of said output filter being varied as a function of the repetition rate of pulses in the pulse train output of the threshold circuit so as to produce an output approximately equal to the time average of the input when averaged over approximately that time required for the discs to make one revolution.

13. Apparatus as claimed in claim 12 that further includes means to control the signal levels applied to the threshold circuits.

14. Apparatus as claimed in claim 13 in which the means to control the signal levels includes a reference radiation detector, not affected by the discs, and further circuitry that act to adjust the intensity of the radiation sources.

15. Apparatus for measuring torque transmitted by a rotating shaft, that comprises: a pair of closely, axially spaced regions along the shaft at each of which is located a disc containing at the same radial distance from the axis of the shaft a series of contiguous areas of different radiation-transmitting characteristics with a sharply defined edge between adjacent areas; and means for sensing the relative angular displacement between the areas of the disc at one region from the areas of the disc at the other region and operable to produce a primary electric signal as a series of electric pulses whose width is related to said angular displacement, the angular displacement from a zero-torque position being a function of the torque transmitted by the shaft, said means for sensing comprising a source of radiation positioned to direct radiation through the radiation-transmitting areas of one disc and then through the radiation-transmitting areas of the other disc, a radiation detector positioned to receive the radiation after it has passed through radiation-transmitting areas of both discs and operable to provide said series of electric pulses as a pulse train, and a unitary mechanical element that holds the radiation source and the radiation detector in rigid mechanical relationship to one another, said unitary mechanical element having two narrow slits between the source of radiation and the radiation detector so that radiation passes from the source, through a first slit, through the radiation transmitting regions of both discs, and through a second slit to the radiation detector, the slits being small enough to provide an effective zone of the detector whose cross dimension in the direction of travel of the areas relative to the radiation detector is small compared to the circumferential length of such areas in such direction and in which the detector response time constants are sufficiently fast that the rise and fall times of each electric pulse are much less than the time duration of the pulse.

16. Apparatus for measuring torque transmitted by a rotating shaft, that comprises: a pair of very closely, axially spaced coaxial discs secured to rotate when the shaft rotates, the discs being mechanically coupled so as to allow angular displacement of one disc relative to the other, each disc containing, at substantially the same radial distance from the axis of the disc, contiguous areas of different optical characteristics extending circumferentially around the disc and having a sharply defined edge between adjacent areas, said angular displacement being a function of the torque being transmitted by the rotating shaft, radiation source means that comprises a plurality of radiation sources angularly spaced from one another circumferentially around the discs, each being adapted to direct radiation through the radiation-transmitting areas of both discs, the radiation being chopped by the discs as the shaft rotates to form a series of optical pulses, the pulse width of the individual optical pulses being a function of said angular displacement; radiation pick-up means that comprises a plurality of detectors, each detector being associated with a radiation source and being positioned to pick up the optical pulses of the associated source and form a series of electric pulses, the pulse width of the individual electric pulses being a function of said angular displacement, and means for processing the series of electric pulses from each radiation detector to determine with great precision the average width of the pulses of each series and to combine the plurality of series to provide an average value thereof, said average value being representative of said torque, said means for processing including means for determining the maximum level of the individual electric pulses of each series and the minimum level of the individual electric pulses of each series and to establish on a consistent basis an intermediate level as to the pulses of each series, the remaining processing elements of the means for processing being adapted to use said consistent intermediate level in establishing torque.

17. Apparatus as claimed in claim 16 in which one of the discs is secured to the shaft and coaxial therewith at a first axial region of the shaft and the other disc is mounted on a sleeve which is secured to the shaft at a second region, the sleeve extending axially toward the first region to place the discs in very close proximity to one another.

18. Apparatus as claimed in claim 17 in which the discs are the order of 0.020 inches thick and the axial spacing of the discs is no greater than the order of 0.010 inches in order that the non-adjacent major surfaces of the discs be no greater than the order of 3/64 inches apart, thereby to minimize error signals in the apparatus due to any misalignment of the associated radiation sources and detectors.

19. Apparatus as claimed in claim 16 that further includes means for maintaining the level of radiation of each radiation source within predetermined levels of radiation.

20. Apparatus for measuring torque transmitted by a rotating shaft, that comprises: a pair of very closely, axially spaced coaxial discs secured to rotate when the shaft rotates, the discs being mechanically resiliently coupled so as to allow angular displacement due to torque of one disc relative to the other, in either direction, each disc containing, at substantially the same radial distance from the axis of the disc, a series of contiguous areas of different optical characteristics extending circumferentially around the disc and having a sharply defined edge between adjacent areas, radiation source means adapted to direct radiation through the radiation-transmitting areas of both discs, the radiation being chopped by the discs as the shaft rotates to form a series of optical pulses, the pulse width of the individual optical pulses being a function of said angular displacement; radiation pick-up means positioned to pick up the optical pulses and operable to form a series of primary electric pulses, the pulse width of the individual primary electric pulses being a function of said angular displacement; and means for processing the primary electric pulses to determine with great precision the average width of the pulses, said average width being representative of said torque, said means for processing including means for detecting the maximum level and the minimum level of the individual electric pulses and for establishing on a consistent basis an intermediate level signal, the remaining processing elements of the means for processing being adapted to use the consistent intermediate level as a basis for determining said torque.

21. Apparatus as claimed in claim 20 that includes threshold detector means connected to receive as one input the primary electric pulses and as another input the intermediate level signal and to use the intermediate level signal as a threshold to form a train of rectangular-wave pulses whose width varies as a function of torque transmitted by the shaft.

22. Apparatus as claimed in claim 21 in which one of the discs is secured to the shaft and is coaxial therewith at a first axial region of the shaft and the other disc is attached to or is part of a sleeve which is secured to the shaft at a second region, the sleeve extending axially toward the first region to place the discs in very close proximity to one another, the shaft thereby providing the resilient mechanical coupling between the discs.

23. Apparatus as claimed in claim 22 in which the discs are no thicker than the order of a millimeter and the axial spacing of the discs is much less than a millimeter in order that the non-adjacent major surfaces of the discs be no greater than 2 millimeters apart, thereby to minimize error signals in the apparatus due to any misalignment of the associated radiation sources and detectors.

24. Apparatus as claimed in claim 20 that further includes means for maintaining the level of radiation of the radiation source means within the predetermined levels of radiation.

25. Apparatus for measuring torque transmitted by a rotating shaft, that comprises: a first element disposed around and secured to the shaft at a first region of the shaft, a second element disposed around said shaft and secured to the shaft at a second region axially displaced along the shaft from the first region, each element being composed of successive areas of different optical characteristics having a sharply defined boundary between adjacent areas, the elements being capable of relative angular displacement to one another as a function of the torque being transmitted by the rotating shaft, radiation source means adapted to direct radiation upon each of the elements whereby the radiation is chopped by each element as the shaft rotates to form optical pulses; radiation pick-up means positioned to pick up the optical pulses and form primary electric pulses; and means for detecting the maximum and minimum signal levels of the primary electric pulses and to establish a weighted average of said levels.

26. Apparatus as claimed in claim 25 in which the radiation source means comprises two radiation sources, one associated with each element and positioned to direct radiation upon the areas of the associated element which chops the same and in which the radiation pick-up means comprises two radiation detectors, each positioned to receive optical pulses from the associated source and to generate a series of primary electric pulses.

27. Apparatus as claimed in claim 26 that further includes pulse-shaper circuitry connected to receive the series of primary electric pulses from each radiation detector and operable to provide a train of rectangular-wave electric pulses whose width is a function of the torque transmitted by the rotating shaft.

* * * * *